(12) United States Patent
Schreter et al.

(10) Patent No.: US 8,793,464 B2
(45) Date of Patent: Jul. 29, 2014

(54) MEMORY MANAGEMENT IN MULTI-THREADED MULTI-PROCESSOR COMPUTING SYSTEM

(75) Inventors: Ivan Schreter, Malsch (DE); Daniel Booss, Wiesloch (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 13/290,802

(22) Filed: Nov. 7, 2011

(65) Prior Publication Data

US 2013/0117519 A1 May 9, 2013

(51) Int. Cl.
*G06F 12/00* (2006.01)
*G06F 12/02* (2006.01)
*G06F 9/52* (2006.01)

(52) U.S. Cl.
CPC .............. *G06F 12/0284* (2013.01); *G06F 9/52* (2013.01)

USPC .......................................... 711/170; 718/104

(58) Field of Classification Search
None
See application file for complete search history.

(56) References Cited

U.S. PATENT DOCUMENTS

2004/0168037 A1* 8/2004 Dearth et al. ................. 711/173
2009/0300638 A1* 12/2009 Gustafsson et al. .......... 718/104
2010/0299672 A1* 11/2010 Tagawa et al. ............... 718/104

* cited by examiner

*Primary Examiner* — Matthew Bradley
*Assistant Examiner* — Daniel Tsui
(74) *Attorney, Agent, or Firm* — Mintz Levin Cohn Ferris Glovsky and Popeo, P.C.

(57) ABSTRACT

Allocators are instantiated for each of a plurality of processors in a multi-threaded multi-processor computing system. The allocators selectively allocate and deallocate memory to threads executing on the associated processor. Related apparatus, systems, techniques and articles are also described.

62 Claims, 2 Drawing Sheets

MEMORY MANAGEMENT IN MULTI-THREADED MULTI-PROCESSOR COMPUTING SYSTEM

TECHNICAL FIELD

The subject matter described herein relates to techniques for selectively allocating and deallocating memory on a processor-by-processor basis in a multi-threaded multi-processor computing system.

BACKGROUND

Memory management acts to dynamically allocate portions of memory to processes at request and to free such portions of memory when they are no longer needed. Memory management scalability is particularly critical in systems simultaneously executing numerous threads.

Some memory management systems utilize global locks across numerous processors which seriously limit scalability and thus throughput. Other memory management systems that associate memory to threads necessarily have a high overhead when a lot of threads are running because each thread has its private memory pool.

SUMMARY

In one aspect, allocators are instantiated for each of a plurality of processors in a multi-threaded multi-processor computing system. These allocators selectively allocate and deallocate, for each processor, memory to threads executing on the processor.

The allocator can be associated with a lock protecting an internal structure of the allocator. If a first allocator is not able to allocate requested memory, the first allocator can unlock its lock and request one or more other allocators to execute the requested memory allocation under their respective lock. The first allocator can repeatedly request the one or more other allocators to execute the requested memory allocation until the request is fulfilled. A second allocator can fulfill the request of the first allocator. The second allocator can be associated with a memory block allocated to fulfill the request. An out-of-memory error can be returned by the first allocator to a corresponding caller if no other allocator can fulfill the request.

At least one allocator can reference a particular memory block. A pointer of the allocator can be stored in a header of a memory block prior to an actual data area of the block that is going to be used by a corresponding caller. The pointer of the associated allocator can be stored external to the memory block. A memory block can be deallocated by its associated allocator under the lock of the allocator if the thread being deallocated runs on the same processor to which this allocator is associated. Deallocated memory blocks can be put to a memory free list upon deallocation with the free list identifying memory available for allocation.

In an interrelated aspect, an associated allocator is instantiated for each of a plurality of processors in a multi-threaded multi-processor computing system, an associated allocator. Thereafter, it is determined, by a first allocator, that it cannot allocate memory. The first allocator then polls a plurality of second allocators to identify one of the second allocators that can allocate memory. The identified second allocator can then allocate memory on behalf of the first allocator.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the techniques described herein enable more rapid memory management in a multi-CPU environment in which many concurrent threads are running. In addition, the current subject matter is advantageous that it can be implemented in systems that cannot be re-written to support cooperative multitasking (e.g., systems with legacy code, etc.), but it scales practically linearly with an increasing number of CPUs while having an overhead comparable to cooperative multitasking allocators.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
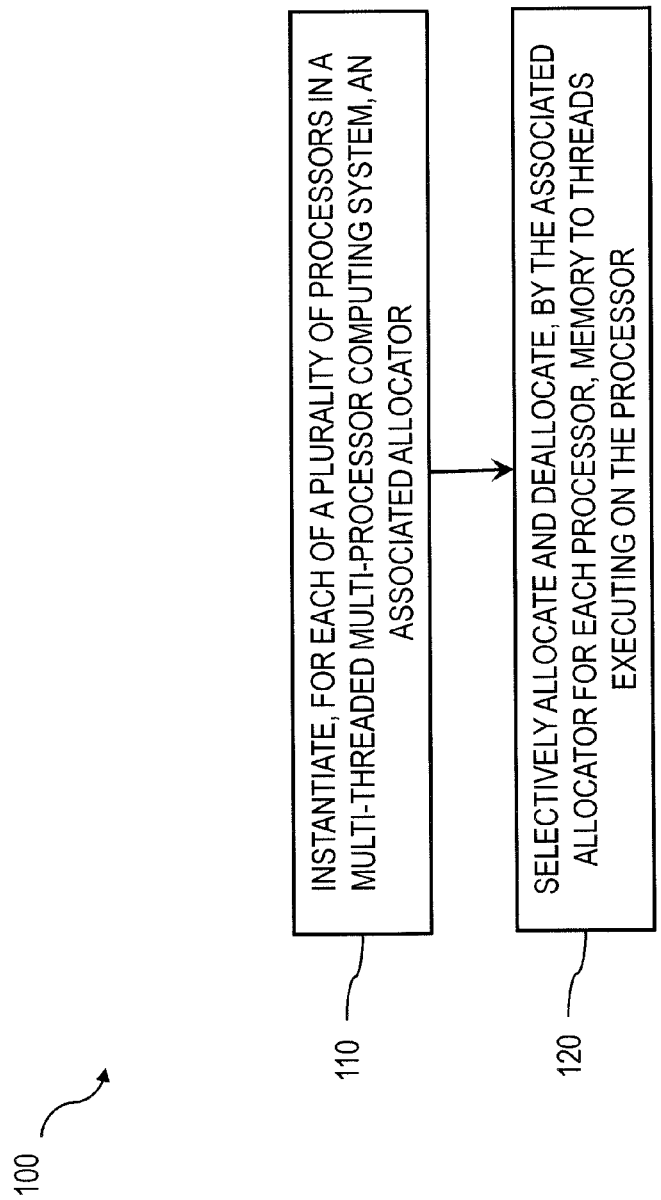
FIG. 1 is a process flow diagram illustrating a technique for selectively allocating and deallocating memory using processor specific allocators.

FIG. 1 is a diagram illustrating a process 100, in which, at 110, an associated allocator is instantiated for each of a plurality of processors in a multi-threaded multi-processor computing system. Thereafter, at 120, memory is selectively allocated and deallocated to threads executing on each processor by the respective allocator associated with the processor on which the respective thread is running.

Figure 2:
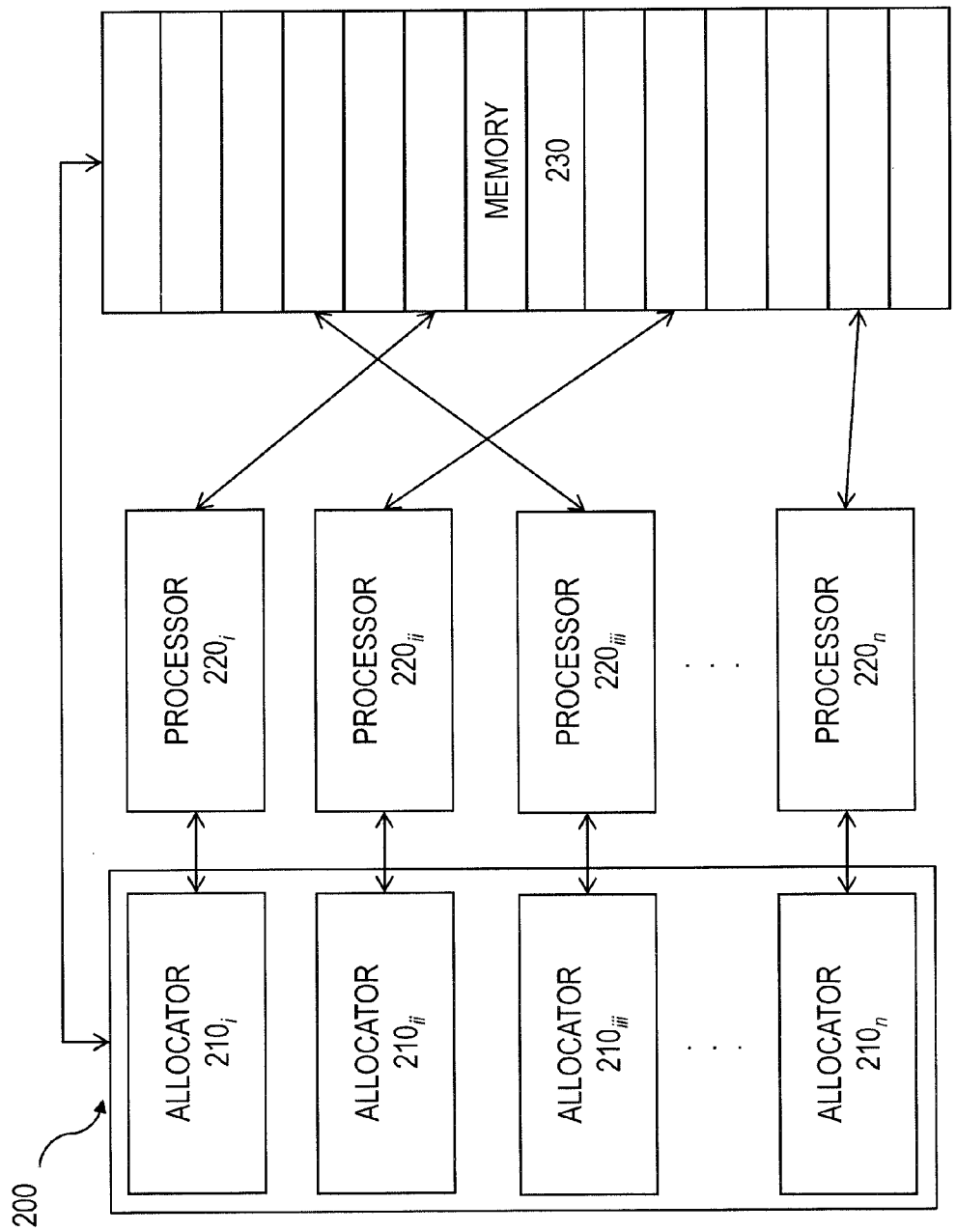
FIG. 2 is a logic diagram illustrating allocation of memory by allocators each being associated with a processor.

FIG. 2 is a diagram 200 that illustrates a plurality of CPUs $220_{i\ldots n}$ each having an associated allocator $210_{i\ldots n}$, that can be used to allocate blocks of memory 230 (sometimes simply referred to as memory) to each CPU $220_{i\ldots n}$. For each CPU $220_{i\ldots n}$ (identified by a CPU index) the associated allocator $210_{i\ldots n}$ is instantiated. When an allocation is requested, the index of the current CPU $220_{i\ldots n}$ (which is processing a currently-running thread) is determined and by this, the corresponding allocator $210_{i\ldots n}$ (which will be used for particular memory allocation or deallocation requests, etc.). Determining a current CPU $220_{i\ldots n}$ using a CPU index can be performed using a single instruction (such as RDTSCP instruction on Intel and AMD x64 CPUs) which enables such determination to happen very quickly.

Memory Allocation.

Each allocator $210_{i\ldots n}$ can be associated with a mutual object exclusion list (mutex), which in turn can be locked during actual memory allocation. The lock can protect against preemption inside of allocation code (as described below). Inside locked scope, possibly some cleanup is done (see memory deallocation below) and then the allocation itself is executed. Allocator $210_{i\ldots n}$ allocating the memory block is associated with the memory block (see deallocation for details), and memory can be returned to the caller (i.e., a thread). As only one thread uses this particular CPU $220_{i\ldots n}$ at any given time, normally no lock conflict occurs, except when the memory allocation is pre-empted and CPU $220_{i\ldots n}$ starts processing another thread, which by chance also wants to allocate memory. As memory allocation routines are highly optimized, the locked scope duration is very short and thus the probability of lock collision is negligible.

In case memory gets very low (i.e., the amount of available memory has been reduced based on consumption by the thread(s)), a CPU-specific allocator $210_{i\ldots n}$ may not be able to fulfill an allocation request. In this case, the allocator $210_{i\ldots n}$ can attempt to "borrow memory" from other CPU-specific allocators $210_{i\ldots n}$. First, the allocator $210_{i\ldots n}$ unlocks its lock (allocation is not executed by this allocator) and then requests one or more of the other CPU-specific allocators $210_{i\ldots n}$ to execute the allocation (under its lock), until it can be fulfilled. If another allocator $210_{i\ldots n}$ can fulfill the allocation request, then this other allocator $210_{i\ldots n}$ will be associated with the newly-allocated memory block, so the deallocation knows which allocator $210_{i\ldots n}$ allocated the block. If no other allocator $210_{i\ldots n}$ can fulfill the allocation request, then an out-of-memory error can be returned to the caller.

Memory Deallocation:

Memory management subsystem provides an efficient way to determine the allocator $210_{i\ldots n}$ which allocated a given memory block (i.e., allocating allocator $210_{i\ldots n}$ is associated with the memory block). This can be realized, for example, by storing a pointer to the allocating allocator $210_{i\ldots n}$ inside of the memory block header before user-specific data (usual method of storing per-block metadata in memory allocators). In some implementations, out-of-block metadata storage can be used to limit the possibility that internal allocator structures are overwritten/destroyed due to invalid use of memory (e.g., overwrite before or past the actual user data block returned by the allocator and the like).

When a deallocation is requested, there are two possibilities. In a first case, the memory block to deallocate was allocated by the same CPU-specific allocator $210_{i\ldots n}$ and so this memory block can, for example, be directly deallocated under the lock of this CPU-specific allocator $210_{i\ldots n}$. Alternatively, the deallocated memory can be put to a free list (which is used to collect deallocated memory for delayed deallocation from other CPUs $220_{i\ldots n}$ into this allocator). In a second case, the memory block was allocated by a different CPU-specific allocator $210_{i\ldots n}$ (i.e., on different CPU $220_{i\ldots n}$. In this situation, the memory block is not directly deallocated, but it can be put into a lock-free freelist of "delayed deallocate" blocks (attached to the CPU-specific allocator $210_{i\ldots n}$ which allocated this memory block). Thus, no locking takes place during deallocation.

The actual deallocation ("cleaning up") of blocks of a particular CPU-specific allocator $210_{i\ldots n}$ can be done when the next allocation is requested in this CPU-specific allocator $210_{i\ldots n}$ (see memory allocation above), or a garbage collection is explicitly requested (which also locks the allocator). As the memory blocks are usually short-lived and are deallocated by the same thread, which allocated the block, the probability of deallocating on the same CPU $220_{i\ldots n}$ (threads are generally only seldom migrated between CPUs $220_{i\ldots n}$) is very high and L2-cache collisions on the CPU-specific allocator freelist are also negligible.

The allocators $210_{i\ldots n}$ can optimally support allocation and deallocation of memory blocks of various size. Allocator techniques such as Doug Lea allocators, slab allocators, buddy allocators, and the like can be used.

Aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer program product comprising a non-transitory machine-readable medium storing instructions that, when executed by at least one programmable processor, cause the at least one programmable processor to perform operations comprising:
   instantiating, for each of a plurality of processors in a multi-threaded multi-processor computing system, an associated allocator, wherein the allocator is associated with a lock protecting an internal structure of the allocator;
   selectively allocating and deallocating, by the associated allocator for each processor, memory to threads executing on the processor, wherein a first allocator is not able to allocate requested memory; and
   unlocking, by the first allocator, its lock and requesting one or more other allocators to execute the requested memory allocation under their respective lock.

2. A computer program product as in claim 1, wherein the first allocator repeatedly requests the one or more other allocators to execute the requested memory allocation until the request is fulfilled.

3. A computer program product as in claim 1, wherein a second allocator fulfills the request of the first allocator.

4. A computer program product as in claim 3, wherein the second allocator is associated with a memory block allocated to fulfill the request.

5. A computer program product as in claim 2, wherein an out-of-memory error is returned by the first allocator to a corresponding caller if no other allocator can fulfill the request.

6. A computer program product as in claim 1, wherein the operations further comprise: associating at least one allocator in reference to a particular memory block.

7. A computer program product as in claim 6, wherein a pointer of the associated allocator is stored in a header of a memory block prior to an actual data area of the block that is going to be used by a corresponding caller.

8. A computer program product as in claim 6, wherein a pointer of the associated allocator is stored external to the memory block.

9. A computer program product as in claim 1, wherein a memory block is deallocated by its associated allocator under the lock of the allocator if the thread being deallocated runs on the same processor to which this allocator is associated.

10. A computer program product as in claim 1, wherein deallocated memory blocks are put to a memory free list upon deallocation, the free list identifying memory available for allocation.

11. A method comprising:
instantiating, for each of a plurality of processors in a multi-threaded multi-processor computing system, an associated allocator; and
selectively allocating and deallocating, by the associated allocator for each processor, memory to threads executing on the processor;
wherein:
the allocator is associated with a lock protecting an internal structure of the allocator;
a first allocator is not able to allocate requested memory, and further comprising:
unlocking, by the first allocator, its lock and requesting one or more other allocators to execute the requested memory allocation under their respective lock.

12. A method as in claim 11, wherein:
the first allocator repeatedly requests the one or more other allocators to execute the requested memory allocation until the request is fulfilled;
a second allocator fulfills the request of the first allocator; and
the second allocator is associated with a memory block allocated to fulfill the request.

13. A method as in claim 12, wherein an out-of-memory error is returned by the first allocator to a corresponding caller if no other allocator can fulfill the request.

14. A method as in claim 11, further comprising: associating at least one allocator in reference to a particular memory block.

15. A method as in claim 14, wherein a pointer of the associated allocator is stored in a header of a memory block prior to an actual data area of the block that is going to be used by a corresponding caller.

16. A method as in claim 14, wherein a pointer of the associated allocator is stored external to the memory block.

17. A method as in claim 12, wherein a memory block is deallocated by its associated allocator under the lock of the allocator if the thread being deallocated runs on the same processor to which this allocator is associated; and wherein deallocated memory blocks are put to a memory free list upon deallocation, the free list identifying memory available for allocation.

18. A method comprising:
instantiating, for each of a plurality of processors in a multi-threaded multi-processor computing system, an associated allocator; and
determining by a first allocator that it cannot allocate memory;
polling, by the first allocator, a plurality of second allocators to identify one of the second allocators that can allocate memory; and
allocating, by the identified second allocator, memory on behalf of the first allocator.

19. A method as in claim 18, wherein the allocator is associated with a lock protecting an internal structure of the allocator.

20. A method as in claim 19, wherein the first allocator is not able to allocate requested memory, and further comprising: unlocking, by the first allocator, its lock and requesting one or more other allocators to execute the requested memory allocation under their respective lock.

21. A method as in claim 20, wherein:
the first allocator repeatedly requests the one or more other allocators to execute the requested memory allocation until the request is fulfilled;
the second allocator fulfills the request of the first allocator; and
the second allocator is associated with a memory block allocated to fulfill the request.

22. A method as in claim 21, wherein an out-of-memory error is returned by the first allocator to a corresponding caller if no other allocator can fulfill the request.

23. A method as in claim 20, further comprising: associating at least one allocator in reference to a particular memory block.

24. A method as in claim 23, wherein a pointer of the associated allocator is stored in a header of a memory block prior to an actual data area of the block that is going to be used by a corresponding caller.

25. A method as in claim 23, wherein a pointer of the associated allocator is stored external to the memory block.

26. A method as in claim 21, wherein a memory block is deallocated by its associated allocator under the lock of the allocator if the thread being deallocated runs on the same processor to which this allocator is associated; and wherein deallocated memory blocks are put to a memory free list upon deallocation, the free list identifying memory available for allocation.

27. A system comprising:
at least one programmable processor; and
memory storing instructions that, when executed by the at least one programmable processor, cause the at least one programmable processor to perform operations comprising:
instantiating, for each of a plurality of processors in a multi-threaded multi-processor computing system, an associated allocator, wherein the allocator is associated with a lock protecting an internal structure of the allocator;
selectively allocating and deallocating, by the associated allocator for each processor, memory to threads executing on the processor, wherein a first allocator is not able to allocate requested memory; and unlocking, by the first allocator, its lock and requesting one or more other allocators to execute the requested memory allocation under their respective lock.

28. A system as in claim 27, wherein the first allocator repeatedly requests the one or more other allocators to execute the requested memory allocation until the request is fulfilled.

29. A system as in claim 28, wherein a second allocator fulfills the request of the first allocator.

30. A system as in claim 29, wherein the second allocator is associated with a memory block allocated to fulfill the request.

31. A system as in claim 28, wherein an out-of-memory error is returned by the first allocator to a corresponding caller if no other allocator can fulfill the request.

32. A system as in claim 27, wherein the operations further comprise: associating at least one allocator in reference to a particular memory block.

33. A system as in claim 32, wherein a pointer of the associated allocator is stored in a header of a memory block prior to an actual data area of the block that is going to be used by a corresponding caller.

34. A system as in claim 32, wherein a pointer of the associated allocator is stored external to the memory block.

35. A system as in claim 27, wherein a memory block is deallocated by its associated allocator under the lock of the allocator if the thread being deallocated runs on the same processor to which this allocator is associated.

36. A system as in claim 27, wherein deallocated memory blocks are put to a memory free list upon deallocation, the free list identifying memory available for allocation.

37. A system as in claim 27, wherein the allocator is associated with a lock protecting an internal structure of the allocator.

38. A system as in claim 37, wherein the first allocator is not able to allocate requested memory, and further comprising: unlocking, by the first allocator, its lock and requesting one or more other allocators to execute the requested memory allocation under their respective lock.

39. A system as in claim 38, wherein:
the first allocator repeatedly requests the one or more other allocators to execute the requested memory allocation until the request is fulfilled;
the second allocator fulfills the request of the first allocator; and
the second allocator is associated with a memory block allocated to fulfill the request.

40. A system as in claim 39, wherein an out-of-memory error is returned by the first allocator to a corresponding caller if no other allocator can fulfill the request.

41. A system as in claim 38, wherein the operations further comprise: associating at least one allocator in reference to a particular memory block.

42. A system as in claim 41, wherein a pointer of the associated allocator is stored in a header of a memory block prior to an actual data area of the block that is going to be used by a corresponding caller.

43. A system as in claim 41, wherein a pointer of the associated allocator is stored external to the memory block.

44. A system as in claim 39, wherein a memory block is deallocated by its associated allocator under the lock of the allocator if the thread being deallocated runs on the same processor to which this allocator is associated; and wherein deallocated memory blocks are put to a memory free list upon deallocation, the free list identifying memory available for allocation.

45. A computer program product comprising a non-transitory machine-readable medium storing instructions that, when executed by at least one programmable processor, cause the at least one programmable processor to perform operations comprising:
instantiating, for each of a plurality of processors in a multi-threaded multi-processor computing system, an associated allocator; and
determining by a first allocator that it cannot allocate memory;
polling, by the first allocator, a plurality of second allocators to identify one of the second allocators that can allocate memory; and
allocating, by the identified second allocator, memory on behalf of the first allocator.

46. A computer program product as in claim 45, wherein the allocator is associated with a lock protecting an internal structure of the allocator.

47. A computer program product as in claim 46, wherein the first allocator is not able to allocate requested memory, and further comprising: unlocking, by the first allocator, its lock and requesting one or more other allocators to execute the requested memory allocation under their respective lock.

48. A computer program product as in claim 47, wherein:
the first allocator repeatedly requests the one or more other allocators to execute the requested memory allocation until the request is fulfilled;
the second allocator fulfills the request of the first allocator; and
the second allocator is associated with a memory block allocated to fulfill the request.

49. A computer program product as in claim 48, wherein an out-of-memory error is returned by the first allocator to a corresponding caller if no other allocator can fulfill the request.

50. A computer program product as in claim 47, wherein the operations further comprise: associating at least one allocator in reference to a particular memory block.

51. A computer program product as in claim 50, wherein a pointer of the associated allocator is stored in a header of a memory block prior to an actual data area of the block that is going to be used by a corresponding caller.

52. A computer program product as in claim 50, wherein a pointer of the associated allocator is stored external to the memory block.

53. A computer program product as in claim 48, wherein a memory block is deallocated by its associated allocator under the lock of the allocator if the thread being deallocated runs on the same processor to which this allocator is associated; and wherein deallocated memory blocks are put to a memory free list upon deallocation, the free list identifying memory available for allocation.

54. A system comprising:
at least one data processor; and
memory storing instructions which, when executed by the at least one data processor, result in operations comprising:
instantiating, for each of a plurality of processors in a multi-threaded multi-processor computing system, an associated allocator; and
determining by a first allocator that it cannot allocate memory;

polling, by the first allocator, a plurality of second allocators to identify one of the second allocators that can allocate memory; and allocating, by the identified second allocator, memory on behalf of the first allocator.

55. A system as in claim 54, wherein the allocator is associated with a lock protecting an internal structure of the allocator.

56. A system as in claim 55, wherein the first allocator is not able to allocate requested memory, and further comprising: unlocking, by the first allocator, its lock and requesting one or more other allocators to execute the requested memory allocation under their respective lock.

57. A system as in claim 56, wherein:

the first allocator repeatedly requests the one or more other allocators to execute the requested memory allocation until the request is fulfilled;

the second allocator fulfills the request of the first allocator; and the second allocator is associated with a memory block allocated to fulfill the request.

58. A system as in claim 57, wherein an out-of-memory error is returned by the first allocator to a corresponding caller if no other allocator can fulfill the request.

59. A system as in claim 56, wherein the operations further comprise: associating at least one allocator in reference to a particular memory block.

60. A system as in claim 59, wherein a pointer of the associated allocator is stored in a header of a memory block prior to an actual data area of the block that is going to be used by a corresponding caller.

61. A system as in claim 59, wherein a pointer of the associated allocator is stored external to the memory block.

62. A system as in claim 57, wherein a memory block is deallocated by its associated allocator under the lock of the allocator if the thread being deallocated runs on the same processor to which this allocator is associated; and wherein deallocated memory blocks are put to a memory free list upon deallocation, the free list identifying memory available for allocation.

\* \* \* \* \*